United States Patent
Gilbert et al.

(10) Patent No.: US 6,732,077 B1
(45) Date of Patent: *May 4, 2004

(54) SPEECH RECOGNIZING GIS/GPS/AVL SYSTEM

(75) Inventors: Charles Gilbert, Sunnyvale, CA (US); James M. Janky, Los Altos, CA (US); Charles N. Branch, Sunnyvale, CA (US); Mark E. Nichols, Sunnyvale, CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1134 days.

(21) Appl. No.: 08/654,401

(22) Filed: May 28, 1996

Related U.S. Application Data

(63) Continuation-in-part of application No. 08/439,967, filed on May 12, 1995, now abandoned.

(51) Int. Cl.$^7$ .............................................. G01L 15/00
(52) U.S. Cl. ..................................... 704/270; 704/275
(58) Field of Search .............. 395/2.79; 364/443–444.2, 364/449.1–449.8; 704/231, 270, 275; 361/680; 705/28; 708/111, 138

(56) References Cited

U.S. PATENT DOCUMENTS

| | | | | |
|---|---|---|---|---|
| 5,214,757 A | * | 5/1993 | Mauney et al. | 364/449.7 |
| 5,317,323 A | * | 5/1994 | Kennedy et al. | 342/457 |
| 5,416,730 A | * | 5/1995 | Lookofsky | 361/680 |
| 5,422,816 A | * | 6/1995 | Sprague et al. | 364/449.7 |
| 5,543,789 A | * | 8/1996 | Behr et al. | 364/449.7 |
| 5,610,821 A | * | 3/1997 | Gazis et al. | 364/444.2 |
| 5,652,570 A | * | 7/1997 | Lepkofker | 340/573 |
| 5,873,070 A | * | 2/1999 | Bunte et al. | 705/28 |

* cited by examiner

*Primary Examiner*—David D. Knepper

(57) ABSTRACT

A speech recognition equipped geographic information recording apparatus and method. In one embodiment, a mobile data terminal has a communication node therein. A geographic mapping system is integral with the mobile data terminal, and is coupled to the communication node. A speech recognition system adapted to receive verbal information is also coupled to the mobile data terminal. The speech recognition system is adapted to receive attribute data verbalized by an operator of the mobile data terminal. Additionally, the speech recognition system is adapted to receive operating commands verbalized by an operator of the mobile data terminal. The communication node of the mobile data terminal includes a transmitter for sending information from the mobile data terminal to a desired location, and a receiver for receiving information from a desired location. In the present embodiment, a real-time communication link exists between the mobile data terminal and the desired location.

17 Claims, 15 Drawing Sheets

SPEECH RECOGNIZING GIS/GPS/AVL SYSTEM

This Application is a continuation-in-part of U.S. patent application Ser. No. 08/439,967 to Branch et al. entitled "Integrated Mobile GIS/GPS/AVL with Wireless Messaging Capability." The Application was filed May 12, 1995, now abandoned.

TECHNICAL FIELD

The present invention relates generally to geographic information systems and, more particularly, to geographic information systems integrated with automatic vehicle location (AVL) systems.

BACKGROUND ART

Geographic information systems (GISs) have been used for years in many industries. GIS technology has found widespread use in, for example, electric and gas utility companies and telecommunication/cable T.V. applications. However, conventional GISs often provide limited services to the user. That is, conventional GISs typically allow the user to display existing background maps on a computer, access previously entered attribute data, and capture additional data. The limited uses combined with the high expense of conventional GISs render such systems unattractive to many potential consumers. Additionally, in conventional GISs, it is extremely expensive to initially populate the GIS data base. Due to poor communication between the "field" and the GIS data base center, getting data from the field to the GIS data base center is an expensive procedure.

Attempts have been made to enhance the marketability and functionality of conventional GISs. For example, Mauney et al. in U.S. Pat. No. 5,214,757 disclose an automated, fully transportable mapping system which utilizes position information gathered from a Global Positioning System (GPS). The position information is used to create new maps or annotate existing maps contained in a GIS data base. Mauney et al. further disclose capturing geographic attribute data in real-time and displaying position information captured by the GPS in real-time. Specifically, the Mauney et al. device displays position information in real-time such that users can track the path on which they are traveling. Geographic attribute data captured while traveling along a path is immediately entered into the automated, fully transportable mapping system. Hence, the data is captured in "real-time." The newly entered attribute data is stored in a file for subsequent inclusion in a GIS data base. Thus, in the Mauney et al. system, even if attribute data is gathered in real-time, the data is then post processed into the GIS data base at a later date.

Mauney et al. also disclose attaching a receiver of the GPS to a portable GIS unit which can be carried by a user. Thus, the GPS receiver can be carried along the path to be mapped, with the remainder of the system remaining at the lab or office. The GPS information is then relayed from the receiver on the portable unit to a GPS computer by way of radio or mobile telephone communication. Therefore, the Mauney et al. system provides GPS capability for precisely creating new maps or annotating existing maps contained in a GIS data base.

Although the Mauney et al. device slightly broadens the functionality of conventional GISs by allowing GPS technology to create and annotate existing GIS data bases, the limited uses and high costs of such a system are still unattractive to many potential consumers.

As an additional drawback, conventional GISs are subject to attribute collection inefficiencies. That is, conventional GISs require the operator to type or otherwise manually enter desired attribute information. Operator errors such as typographical errors can affect the reliability of collected attribute information. Similarly, many operators lack the data entry skills needed to quickly and efficiently enter the desired attribute information. Thus, many prior art systems are both operator "unfriendly" and inefficient.

Consequently, the need has arisen for a versatile GIS which has expanded functionality, a versatile GIS which is not limited to merely using GPS technology to create and annotate existing GIS data bases, a versatile GIS system which has improved marketability to potential consumers, and a GIS system which is easy and efficient for an operator to use.

DISCLOSURE OF THE INVENTION

It is, therefore, an object of the present invention to provide a versatile GIS which has expanded functionality, a versatile GIS which is not limited to merely using GPS technology to create and annotate existing GIS data bases, a versatile GIS system which has improved marketability to potential consumers, and a GIS system which is easy and efficient for an operator to use. The above object has been achieved by an integrated geographic information and automatic position location system.

In one embodiment of the present invention, a mobile data terminal having a communication node is removably disposed within a vehicle. The communication node provides for the exchange of information between an integrated geographic information system and at least one desired location such as a base station. The communication node further provides for the exchange of information between an automatic vehicle location system and a base station. The integrated geographic information and automatic vehicle location system includes a vehicle position tracking system which is coupled to the communication node. The present invention also includes a geographic mapping system which is also coupled to the communication node. A speech recognition system is coupled to the mobile data terminal. The speech recognition system adapted to receive verbal information such as operation commands and attribute information from an operator of the mobile data terminal.

Although the integrated geographic information and automatic position locating system is described in most of the following embodiments as being disposed within a vehicle, the present invention is also well suited, for example, to being carried by hand, disposed in other conveyances, and the like. Furthermore, although the present embodiment specifically recites an integrated "geographic" information and automatic position location system, the present invention is also well suited to using "non-geographic" information. In such an instance, non-geographic information such as utility company power pole inventory data, transformer specifications, and the like, are used in conjunction with the automatic position location system.

In the present embodiment, the vehicle position tracking system includes a GPS signal receiver, and a signal processor coupled to the signal receiver for generating position information from GPS signals received by the GPS signal receiver. The geographic mapping system includes memory for storing previously recorded geographic information, an input for entering new geographic information, and a display for displaying visual images of the previously recorded geographic information and the newly entered geographic information. In the present embodiment, the previously recorded geographic information can be updated when desired using position information generated by the GPS employed in the vehicle position tracking system.

Furthermore, in the present embodiment, the communication node coupled to both the vehicle position tracking system and the geographic mapping system provides a two-way communication link between the integrated geographic information and automatic vehicle location system and at least one desired location such as a base station. In so doing, a user of the geographic mapping system can immediately receive information. Thus, in one embodiment, the present invention eliminates the need for a user to return to a base station to download newly captured attribute data into the GIS data base. Likewise, the previously recorded geographic information in the possession of the user can be immediately updated with new geographic information. Additionally, the base station can communicate with the user via the present integrated geographic information and automatic vehicle location system even when the user is not at the base station.

The present invention is also well suited to providing communication to more than one base station. That is, the present invention is well suited to providing communication to an automatic vehicle location base station and to a separately located geographic information base station. Also, the present invention is also well suited to providing communication to only one of either the automatic vehicle location base station or the geographic information base station.

In the present embodiment, the input and display unit of the geographic mapping system are also used by the vehicle position tracking system. Thus, a vehicle monitor at the base station can immediately inform a user, for example, that the user has varied from a specified work route. Likewise, the user can send messages to the vehicle monitor back at the base station. The vehicle user might inform the base station, for example, that a deviation from the scheduled route is required due to a detour, a traffic accident, and the like.

In the present embodiment, the communication link established between the integrated geographic information and automatic vehicle location system and the desired location is established using one of various communication link techniques. Furthermore, in one embodiment of the present invention the communication link is a real-time two-way communication link.

Thus, the present invention provides a versatile GIS which has expanded functionality, a versatile GIS which is not limited to merely using GPS technology to create and annotate existing GIS data bases, a versatile GIS system which has improved marketability to potential consumers, and a GIS system which is easy and efficient for an operator to use.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "calculating", "accessing", "retrieving" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1A:
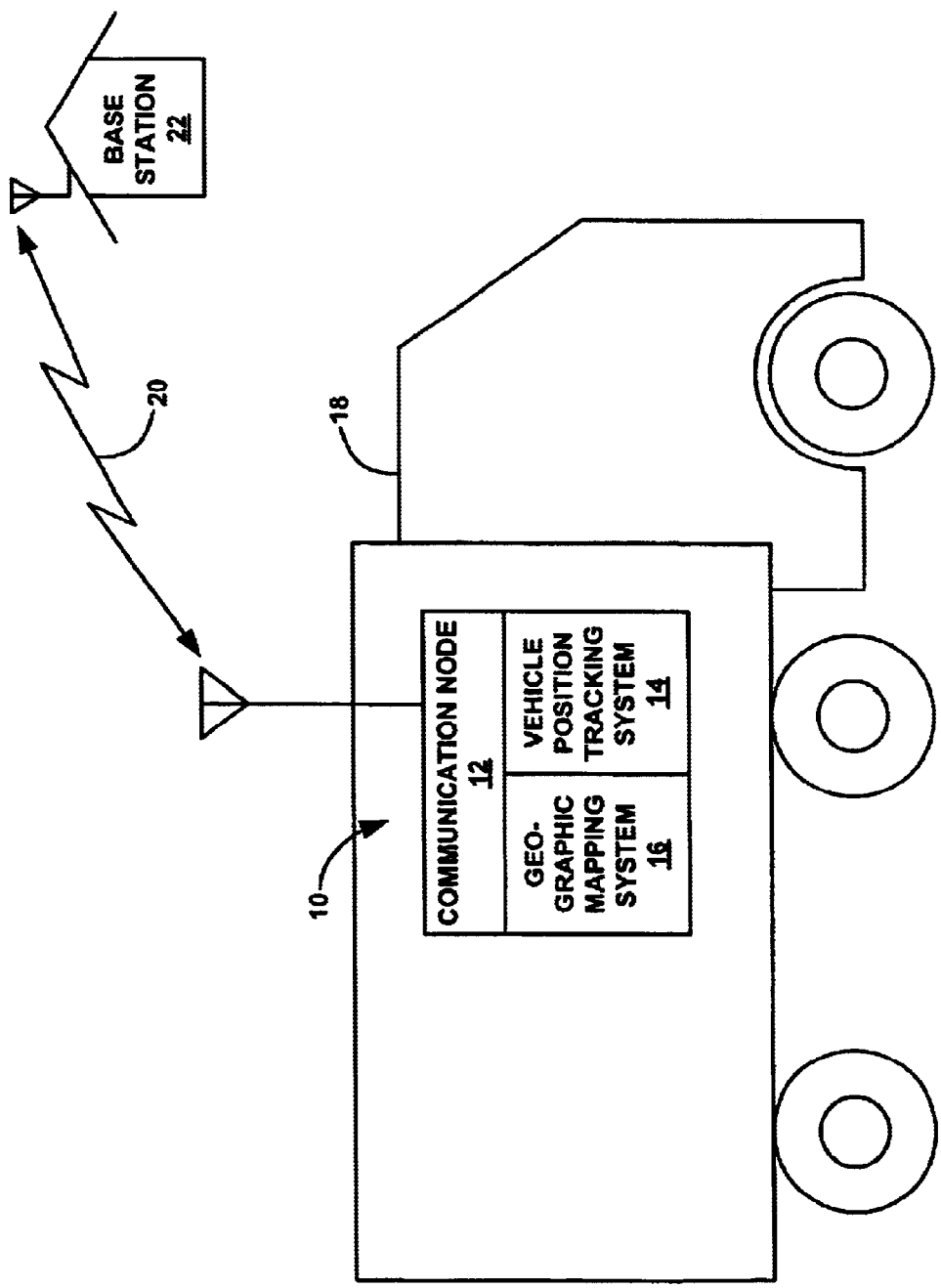
FIG. 1A is a schematic diagram of an integrated geographic information and automatic vehicle location system in accordance with the present invention.

With reference now to FIG. 1A, a schematic block diagram illustrating various components of the present invention is shown. As shown in FIG. 1A, the present integrated geographic information and automatic vehicle location system 10 including a communication node 12, a vehicle position tracking system 14, and a geographic mapping system 16 is disposed within a vehicle 18. In the present embodiment, vehicle 18 is, for example, a utility company vehicle. It will be understood, by those of ordinary skill in the art, that vehicle 18 could be any one of numerous other types of vehicles as well. Vehicle position tracking system 14, and geographic mapping system 16 are both coupled to communication node 12. Communication node 12 provides a communication link 20 between a base station 22 and integrated geographic information and automatic vehicle location system 10.

Figure 1B:
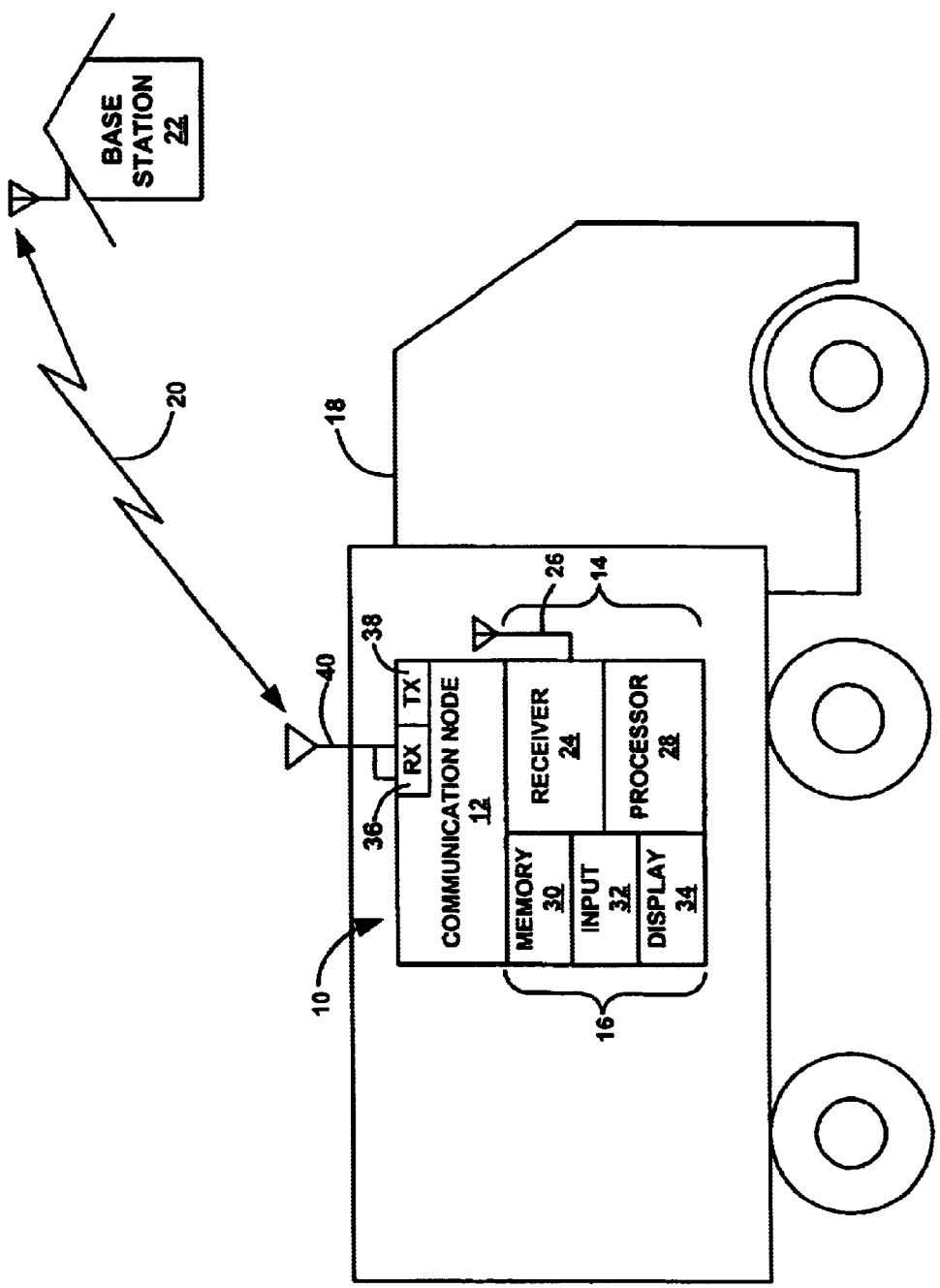
FIG. 1B is a more detailed schematic diagram of the integrated geographic information and automatic vehicle location system of FIG. 1A in accordance with the present invention.

With reference next to FIG. 1B, a more detailed schematic block diagram of integrated geographic information and automatic vehicle location system 10 illustrating various components of the present invention is shown. In the present embodiment, vehicle position tracking system 14 includes a receiver 24 having an antenna 26 attached thereto, and a signal processor 28. In the present invention, vehicle position tracking system 14 is, for example, GPS-based position tracking system. GPS signals received at antenna 26 of receiver 24 are processed by processor 28 to give the precise geographic location of vehicle 18. The present invention is also well suited, however, to transmitting the received signals back to base station 22 for processing. The position of the vehicle is then monitored, for example, by a dispatcher located at base station 22. The dispatcher monitors vehicle 18 to insure that vehicle 18 remains on a given route, or the dispatcher positions the utility vehicles for the most efficient coverage, or the dispatcher determines which utility vehicle is nearest to an emergency and the like. Thus, the present invention enables the position of vehicle 18 to be precisely monitored.

Although GPS is specifically recited in the present embodiment, other satellite-based systems such as the Global Orbiting Navigational Satellite System (GLONASS) are also well suited to the present invention. Also, although a satellite-based position determining system is specifically mentioned in the present embodiment, the present invention is also well suited to land-based radio navigation systems such as, for example, LORAN, Shoran, Decca, and TACAN.

With reference still to FIG. 1B, geographic mapping system 16 further includes memory 30, an input 32 for entering information, and a display unit 34. In the present embodiment, memory 30 stores, for example, previously recorded geographic information. Input 32 in the present embodiment is comprised, for example, of a data entry keypad, a pen-type data entry pad, and the like. In conventional geographic mapping systems, while physically present at the base station, the user of the prior art GIS device would download, for example, geographic attributes of a desired area. If the user of the prior art device wished to obtain geographic information on a different area, the user would return to the base station and download the additional information. In the present invention, however, geographic information on a desired area can either be downloaded while the user is located at the base station or, geographic information can be transmitted to the user over communication link 20. Thus, the present invention eliminates the need for the user to be at the base station in order to receive information. Consequently, the user can also receive new geographic information, via receiver 36 and antenna 40 of communication node 12, on a different area without having to return to the base station. Furthermore, although the present embodiment specifically recites an integrated "geographic" information and automatic position location system, the present invention is also well suited to using "non-geographic" information. In such an instance, non-geographic information such as utility company power pole inventory data, transformer specifications, and the like, are used in conjunction with the automatic position location system. Thus, in such an embodiment, the present invention provides an integrated "information reporting" and automatic position location system.

Although geographic information is immediately transmitted over communication link 20 in the present embodiment, the present invention is also well suited to storing geographic information in memory 30 and transmitting it to base station 22 at a later time. Likewise, the present invention is well suited to storing geographic information in memory 30 and downloading the information to the geographic information data base when the user returns to base station 22. The present invention is well suited to being employed as a core module in an on-vehicle computer. However, the present invention is also well suited to being employed as, for example, a Personal Computer Memory Card International Association card (PCMCIA) card". That is, the present integrated geographic information and automatic vehicle location system 10 can be configured as a mobile lightweight and easy to use card system in a format similar to, for example, the ASPEN card system, or the Trimble Mobile Gold Card System of Trimble Navigation Ltd., Sunnyvale Calif.

In the present embodiment, the geographic information contained within memory 30 is displayed on display unit 34. In addition to displaying geographic mapping system information on display unit 34, the present invention also displays vehicle position tracking information on display unit 34. Such vehicle position tracking information includes, for example, the location of other utility service vehicles.

In addition to receiving geographic information over communication link 20, the present invention also transmits information, via transmitter 38 and antenna 40 of communication node 12, over communication link 20. In so doing, the present invention is able to update previously recorded geographic information. For example, a user of the present invention might discover that the position of a geographic attribute has been erroneously surveyed. The user of the present invention then transmits the corrected position of the geographic attribute back to the base station to update the existing data base. In the present invention, the precise position locating capabilities of the GPS in vehicle position tracking system 14 provide additional updating capability. That is, a user of the present invention is able to precisely determine the position of geographic attributes using GPS technology. If the user determines that previously recorded geographic information is inaccurate, the user transmits the correct coordinates to base station 22. The present invention is also well suited to placing the updated/corrected geographic information into a storage file. A data base manager is then able to review updated/corrected geographic information submitted from the field. The data base manger is then able to approve or deny inclusion of the updated/corrected geographic information into the data base. As a result, the present invention allows for updating of a geographic information data base while still allowing a data base manager to monitor the integrity of the data base.

In the present embodiment, communication link 20 between integrated geographic information and automatic vehicle location system 10 and base station 22 is a two-way communication link. Although such a communication link is used in the present embodiment, the present invention is also well suited to employing a one-way link between integrated geographic information and automatic vehicle location system 10 and base station 22. Furthermore, the present invention is also well suited to having a real-time communication link between integrated geographic information and automatic vehicle location system 10 and base station 22.

In addition to transmitting geographic mapping system information over link 20, via transmitter 38 and antenna 40 of communication node 12, the present invention also transmits vehicle position tracking information, entered using input 32, over link 20. Such vehicle position tracking information might includes, for example, that a deviation from the scheduled route is required due to a detour, a traffic accident, and the like. Thus, the present embodiment provides an integrated geographic information and automatic vehicle location system 10 wherein a geographic mapping system 16 and a vehicle position tracking system 14 share a communication node 12, an input 32, and a display 34.

In the present invention, communication link 20 is established in one of many ways. For example, communication link 20 can be established using a Metricomm Wide Area Network (WAN) link operating at approximately 900 MHz. Communication link 20 can be established using a standard cellular telephone connection. Communication link 20 can also be established using a trunked radio system. In such a system, transmitter 38 of communication node 12 first contacts "headquarters" or a communication base and is assigned a communication channel. Communication node 12 then knows that communication between integrated geographic information and automatic vehicle location system 10 and base station 22 must take place over the assigned channel. Communication link 20 can also be established using a Cellular Digital Packet Data (CDPD) protocol. In the CDPD protocol, a modem and a radio are used to send data at a rate of 19.2 Kbits/s over cellular circuits not currently being used for speech transmissions. A control channel is called, and the user is assigned a channel. Communication node 12 then bursts packet data, using, for example, TCP/IP protocol, to deliver the data to base station 22 until the data is completely transmitted or until the channel is no longer free. If the data is not completely transferred when the channel expires, communication link 20 is then established using a different channel. As yet another example, communication link 20 can be established using a Subscription Mobile Radio (SMR) system wherein integrated geographic information and automatic vehicle location system 10 has an assigned frequency for communication link 20. The present invention is also well suited to having an rf communication link 20 between integrated geographic information and automatic vehicle location system 10 and base station 22. Additionally, although all of the components of the present invention communicate with the same base station in the present embodiment, the present invention is also well suited to having the components communicate with different respective base stations.

Figure 1C:
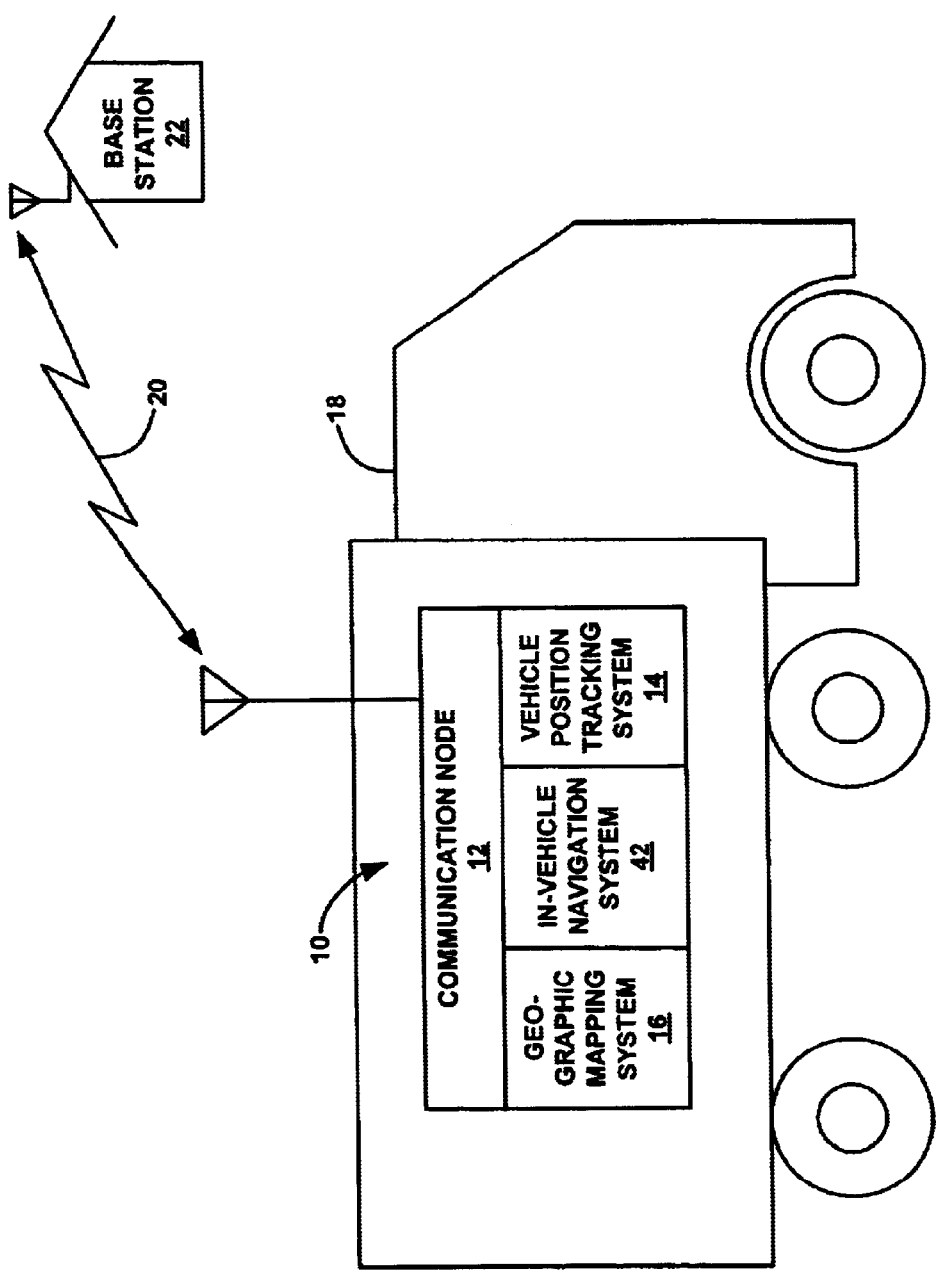
FIG. 1C is a schematic diagram of the integrated geographic information and automatic vehicle location system of FIG. 1A including an in-vehicle navigation system in accordance with the present invention.

With reference next to FIG. 1C, a schematic diagram of another embodiment of the present invention in which the integrated geographic information and automatic vehicle location system includes an in-vehicle navigation system 42 is shown. In-vehicle navigation system typically includes a data base located at a base station for storing navigational information. As shown in FIG. 1C, in-vehicle navigation system 42 is coupled to communication node 12. Therefore, in the present embodiment, navigational information can be transmitted to vehicle 18 when desired. As a result, new navigational information is accessible to a user of the present system without requiring the user to return to the base station. In the present embodiment, the navigational information is displayed on display unit 34 of FIG. 1B. Thus, a user of the present invention can access navigational information and have the information visually displayed within vehicle 18. Likewise, input 32 of FIG. 1B is also used to input various in-vehicle navigation-related information. Such information includes, for example, a request for the base station to transmit navigation information on a desired area. Thus, the present invention provides yet another degree of functionality and marketability. Although the present embodiment specifically recites the use of an in-vehicle navigation system, the present invention is also well suited to the use of a navigation system which is not specifically a "in-vehicle" navigation system. That is, the present invention is also well suited to providing a navigation system to a unit which is hand-carried or otherwise conveyed.

Figure 1D:
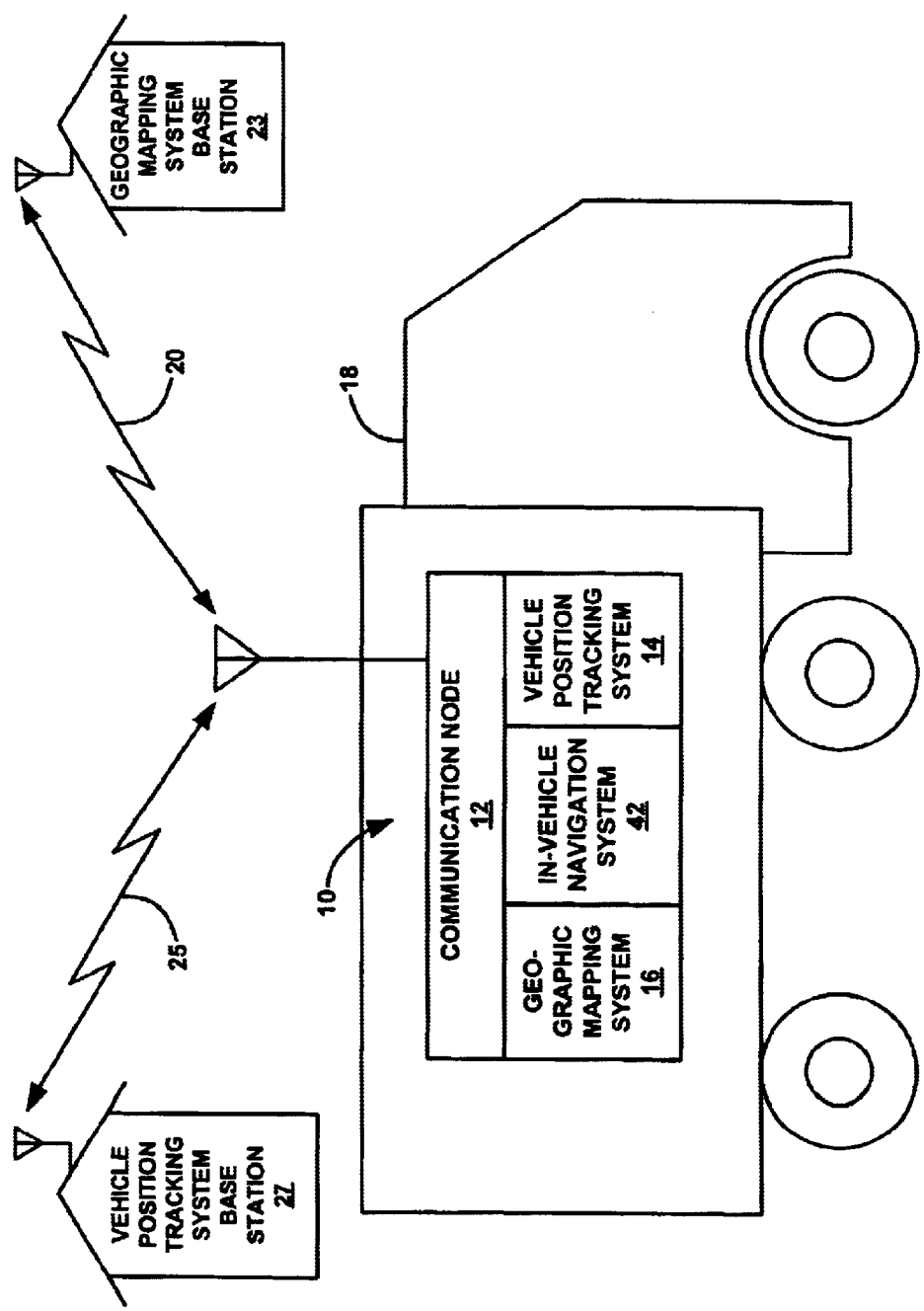
FIG. 1D is a schematic diagram of an integrated geographic information and automatic position location system in accordance with the present invention.

With reference next to FIG. 1D, a schematic diagram of another embodiment of the present invention is shown in which the integrated geographic information and automatic vehicle location system communicates with two separately located base stations. As shown in FIG. 1D, the present invention is also well suited to providing communication to more than one base station. That is, the present invention is well suited to providing communication between a separately geographic mapping base station 23 via communication link 21, and to providing communication between a vehicle position tracking base station 27 via communication link 25. In the present embodiment, communication link 21 is a CDPD link, while communication link 25 is a radio link. Although such types of communication links are specified in the present embodiment, the present invention is also well suited to numerous other types of-communication links. In one embodiment of the present invention, each of base stations 23 and 27 would have a unique "phone" number or activation protocol. During use, a field worker would simply dial the phone number or activate the communication link using the activation protocol to communicate with the desired base station. Also, the present invention is also well suited to providing communication to only one of either geographic mapping system base station 23 or vehicle position tracking system base station 27.

Figure 1E:
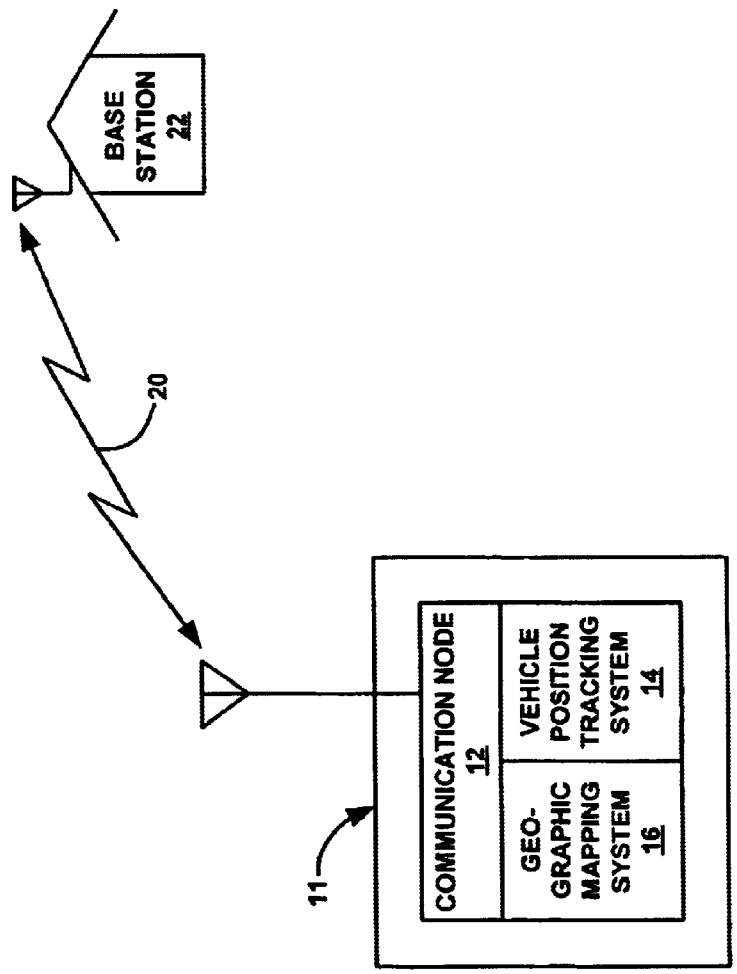
FIG. 1E is a "hand-carried" integrated geographic information and automatic position locating system in accordance with the present invention.

With reference next to FIG. 1E, a schematic diagram of another embodiment of the present invention is shown in which an integrated geographic information and automatic position locating system 11 is not disposed within a vehicle. As shown in FIG. 1E, the present invention is also well suited to being hand-carried or otherwise conveyed, without being disposed in a vehicle as shown in the embodiments of FIGS. 1A–1D. That is, the present invention is well suited, for example, to being carried by hand, disposed in other conveyances, and the like. As in the previous embodiments, communication node 12 provides a communication link 20 between a base station 22 and integrated geographic information and automatic position locating system 11.

Figure 2A:
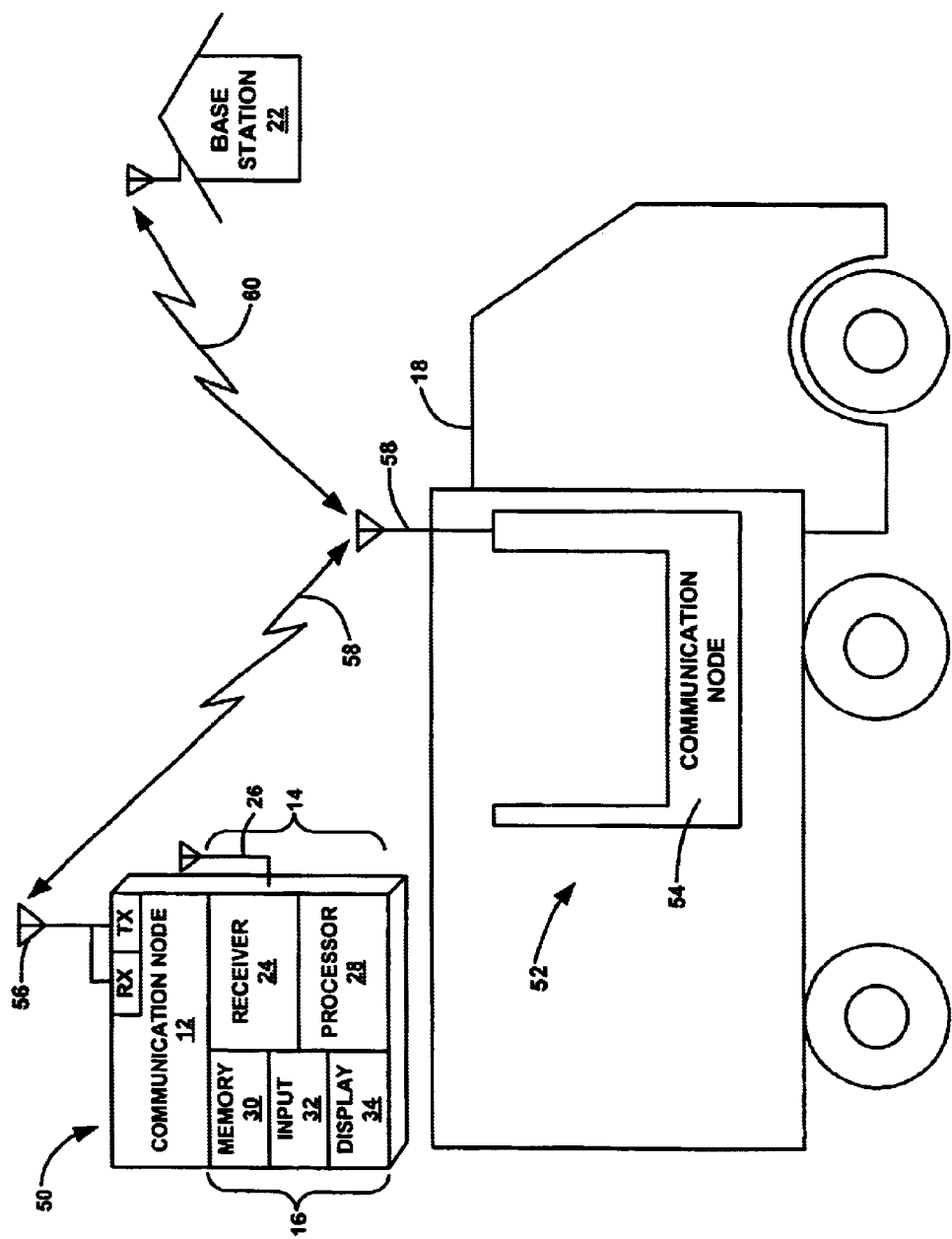
FIG. 2A is a schematic diagram of an integrated geographic information and automatic vehicle location system wherein the integrated geographic information and automatic vehicle location system includes a portable data terminal in accordance with the present invention.

With reference next to FIG. 2A, a schematic diagram of another embodiment of the present invention is shown wherein the system 10 includes a portable data terminal 50. In the present embodiment, communication node 12, a vehicle position tracking system 14, and a geographic mapping system 16 are disposed within a portable data terminal 50. A docking station 52 is disposed within vehicle 18. As shown in FIG. 2A, portable data terminal 50 is removably attachable to docking station 52. That is, portable data terminal 50 can perform all of the functions of the above-described embodiments when disposed within docking station 52 and when removed from docking station 52.

In the present embodiment, portable data terminal 50 is a compact transportable unit which allows the user to carry portable data unit 50 to locations distant from vehicle 18. Thus, a user can enter geographic information or communicate with the base station even when away from vehicle 18. Additionally, in the present embodiment, portable data terminal has the GPS receiver contained therein. Thus, in the present embodiment, the position of the user is known by the dispatcher even when the user is not located within the vehicle. Such information can be extremely beneficial should the user become injured or need to be located. That is, instead of having to return to vehicle 18 to activate a panic button, the user can activate a panic button, not shown, located on portable data terminal 50. The distress signal then includes the geographic coordinates of the distressed user, not the coordinates of vehicle 18, thereby providing more efficient and faster responses.

In the present invention, communication link 20 is established in one of numerous method described in conjunction with the above-mentioned embodiments. That is, communication link 20 can be established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

With reference still to FIG. 2A, in the present embodiment, when portable data terminal 50 is removed from docking station 52, portable data terminal 50 communicates with docking station 52. More specifically, communication node 12 of portable data terminal 50 transfers information over link 58 to communication node 54 of docking station 52. Docking station 52 then transfers information to and from base station 22 over link 60. In so doing, portable data terminal 50 is able to transmit using low power and still communicate, through docking station 52, with base station 22. Thus, portable data terminal 50 is able to operate using low power sources such as batteries. As with communication link 20 of FIGS. 1A–1C, communication links 58 and 60 can be established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. Although communication node 54 of docking station 52 acts as a relay station for information transmitted to portable data terminal 50 from base station 22, the present invention is also well suited to having base station 22 transmit information directly to communication node 12 of portable data terminal 50.

In the present embodiment, communication links 58 and 60 are two-way communication links. Although such communication links are used in the present embodiment, the present invention is also well suited to employing one-way links between portable data terminal 50 and docking station 52, and docking station 52 and base station 22. Furthermore, the present invention is also well suited to having real-time communication links between portable data terminal 50 and docking station 52, and docking station 52 and base station 22.

Figure 2B:
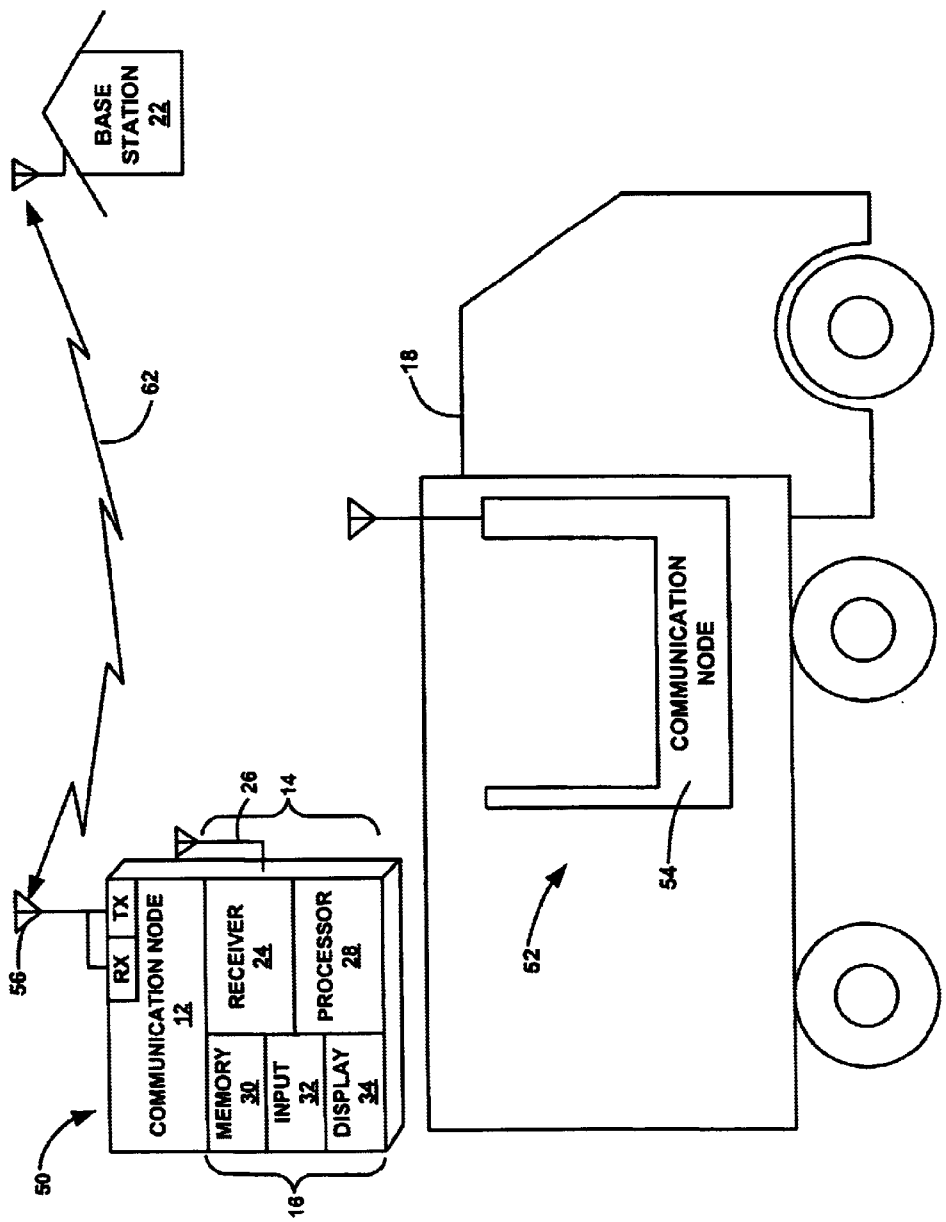
FIG. 2B is a schematic diagram of the integrated geographic information and automatic vehicle location system of FIG. 2A wherein the portable data terminal is communicatively linked directly to a base station in accordance with the present invention.

With reference next to FIG. 2B, a schematic diagram of another embodiment of the present invention is shown in which portable data terminal 50 communicates directly with base station 22. As shown in FIG. 2B, when portable data terminal 50 is removed from docking station 52 communication node 12 establishes a communication link 62 between portable data terminal 50 and base station 22. By communicatively linking portable data terminal 50 directly with base station 22 the present embodiment eliminates the need for an additional communication node at docking station 52. As described in conjunction with previous embodiments, communication link 62 is established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

In the present embodiment, when portable data terminal 50 is removed from docking station 52, antenna 56 facilitates transmission and reception of information signals. In this embodiment, when portable data terminal 50 is placed into docking station 52, antenna 58 facilitates transmission and reception of information signals. That is, antenna 56 folds up or is otherwise disabled when portable data terminal 50 is placed into docking station 52, thereby insuring that only one antenna is used to receive information signals at any given time.

Figure 2C:
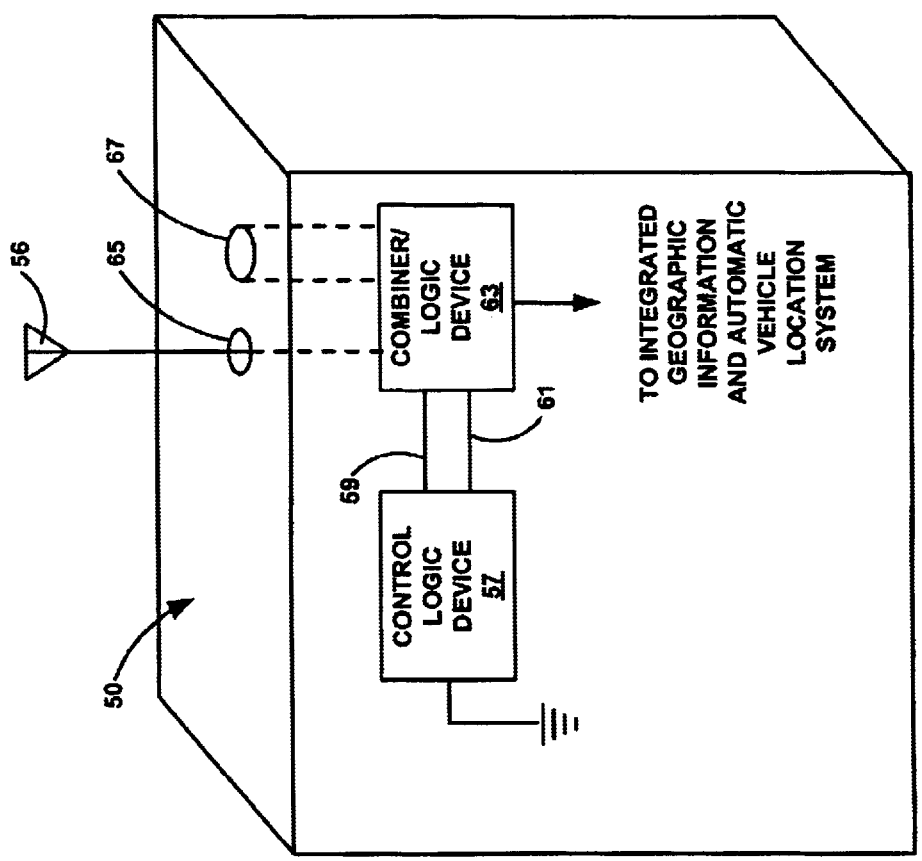
FIG. 2C is a schematic diagram of an antenna multiplexing system in accordance with the present invention.

With reference next to FIG. 2C, a schematic diagram of an antenna multiplexing system of one embodiment of the present invention is shown. In the present embodiment, portable data terminal 50 includes control logic device 57 which provides power D.C. power line 59 or 61 to combiner/logic device 63. Combiner/logic device 63 is coupled to both local antenna LNA (low noise amplifier) input port 65, and remote antenna LNA input port 67. In the present embodiment, combiner/logic device 63 is a 3 dB passive hybrid microwave combiner with an integral DC supply to each input port 65 and 67, respectively. Control logic device 57 senses connections and adjusts the supply of D.C. power accordingly. Specifically, control logic device 63 senses the current draw from local antenna LNA input port 65 and/or from remote antenna LNA input port 67. When remote antenna LNA input port is drawing current, the local antenna is turned off or de-activated. Thus, whenever portable data terminal 50 is removed from docking station 52 of FIG. 2B, and a remote antenna is inserted into remote antenna LNA input port 67, local antenna 56 is de-activated. Although such an antenna configuration is used in the present embodiment, the present invention is also well suited to the use of other types of antenna configurations.

The present invention is also well suited to having a remotely disposed antenna plugged into remote antenna LNA input port 67. For example, the present invention is well suited to having a connecting cable, extending from a hard hat embedded antenna, plugged into remote antenna LNA input port 67. Likewise, the present invention is also well suited to having a connecting cable extending from a hand-held antenna plugged into remote antenna LNA input port 67. Thus, the present invention allows distantly located antennae to be coupled thereto.

Figure 2D:
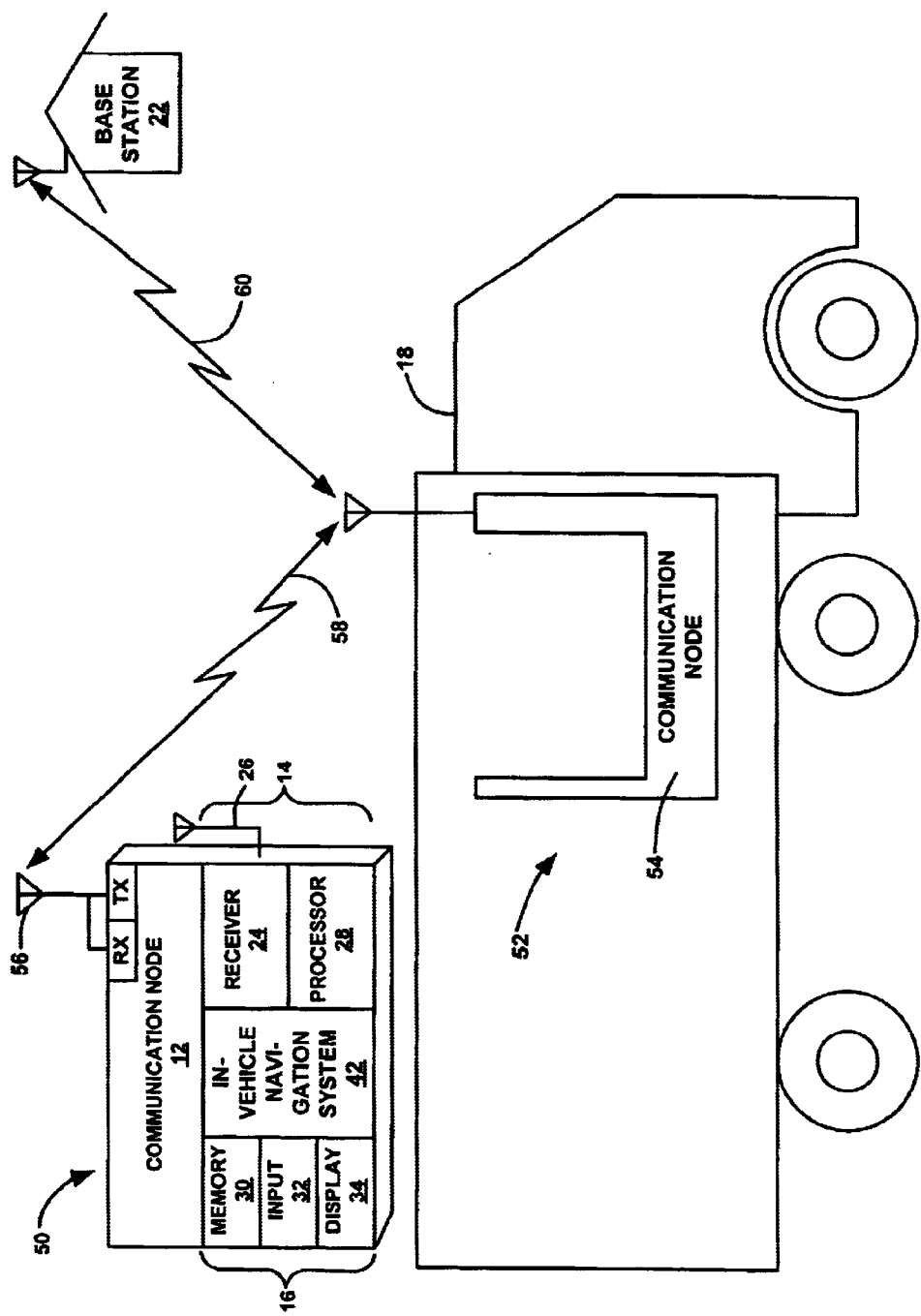
FIG. 2D is a schematic diagram of the integrated geographic information and automatic vehicle location system of FIG. 2A including an in-vehicle navigation system in accordance with the present invention.

With reference next to FIG. 2D, a schematic diagram of another embodiment of the present invention in which the integrated geographic information and automatic vehicle location system includes an in-vehicle navigation system 42 is shown. In-vehicle navigation system typically includes a data base located at a base station for storing navigational information. As shown in FIG. 2D, in-vehicle navigation system 42 is coupled to communication node 12. Therefore, in the present embodiment, navigational information can be transmitted to portable data terminal 50 when desired, even if portable data terminal is not located within vehicle 18. In the present embodiment, the navigational information is displayed on the display unit located on portable data terminal 50. Thus, a user of the present invention can access navigational information and have the information visually displayed. Likewise, the input of portable data terminal 50 is also used to input various in-vehicle navigation-related information. Such information includes, for example, a request for the base station to transmit navigation information on a desired area. As a result, new navigational information is accessible to a user of the present system without requiring the user to return to the base station. Hence, the present invention provides another degree of functionality and marketability.

Figure 3A:
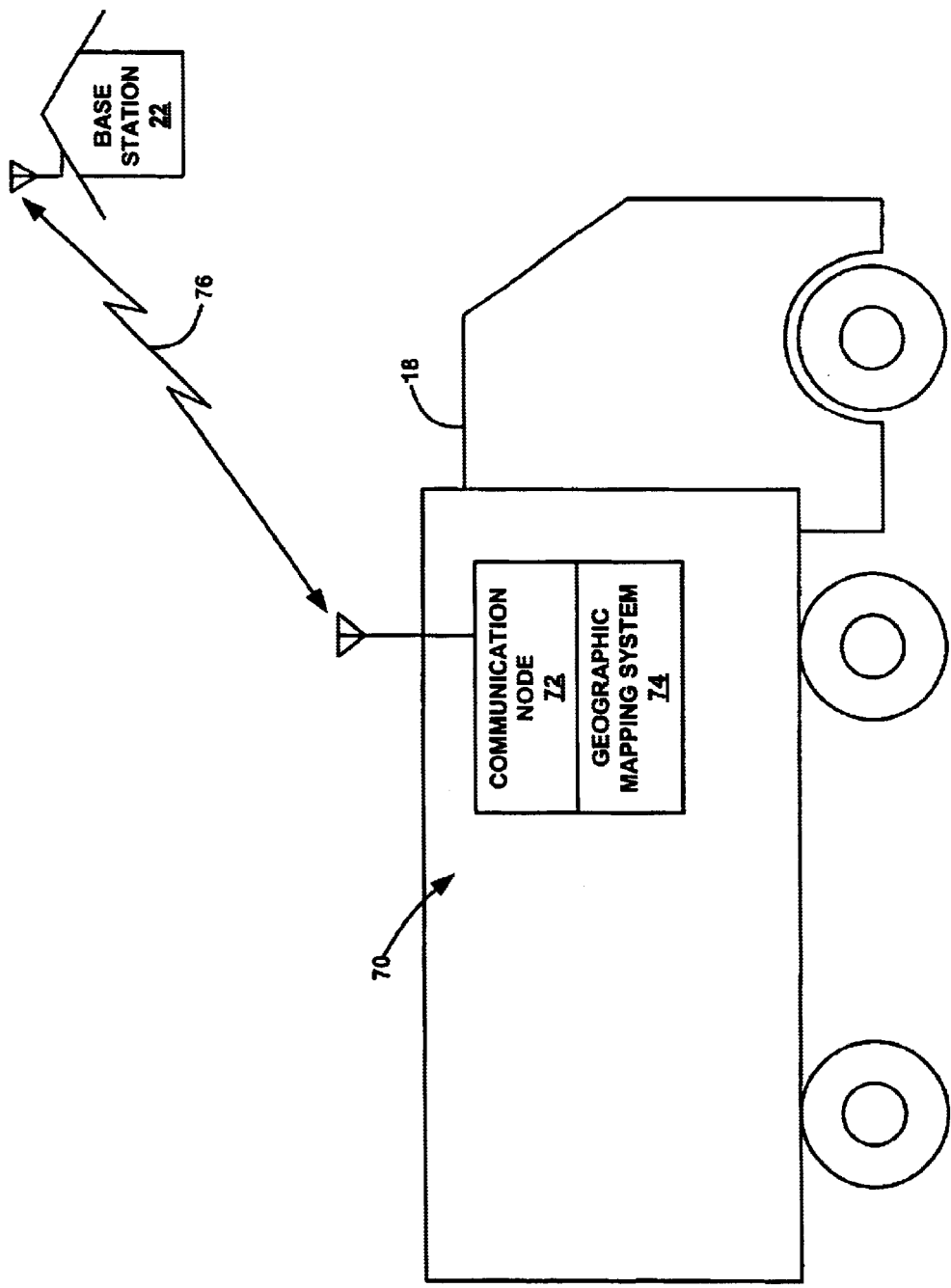
FIG. 3A is a schematic diagram of a real-time geographic mapping system disposed within a vehicle wherein the system communicates in real-time with a base station in accordance with the present invention.

With reference next to FIG. 3A, a schematic block diagram of another embodiment of the present invention is shown in which a geographic mapping system disposed within a vehicle communicates in real-time with a base station. As shown in FIG. 3A, the present real-time geographic information system 70 includes a communication node 72, and a geographic mapping system 74 disposed within a vehicle 18. Communication occurs in real-time over link 76 between real-time geographic information system 70 and base station 22.

As described in conjunction with previous embodiments, communication link 76 is established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

Figure 3B:
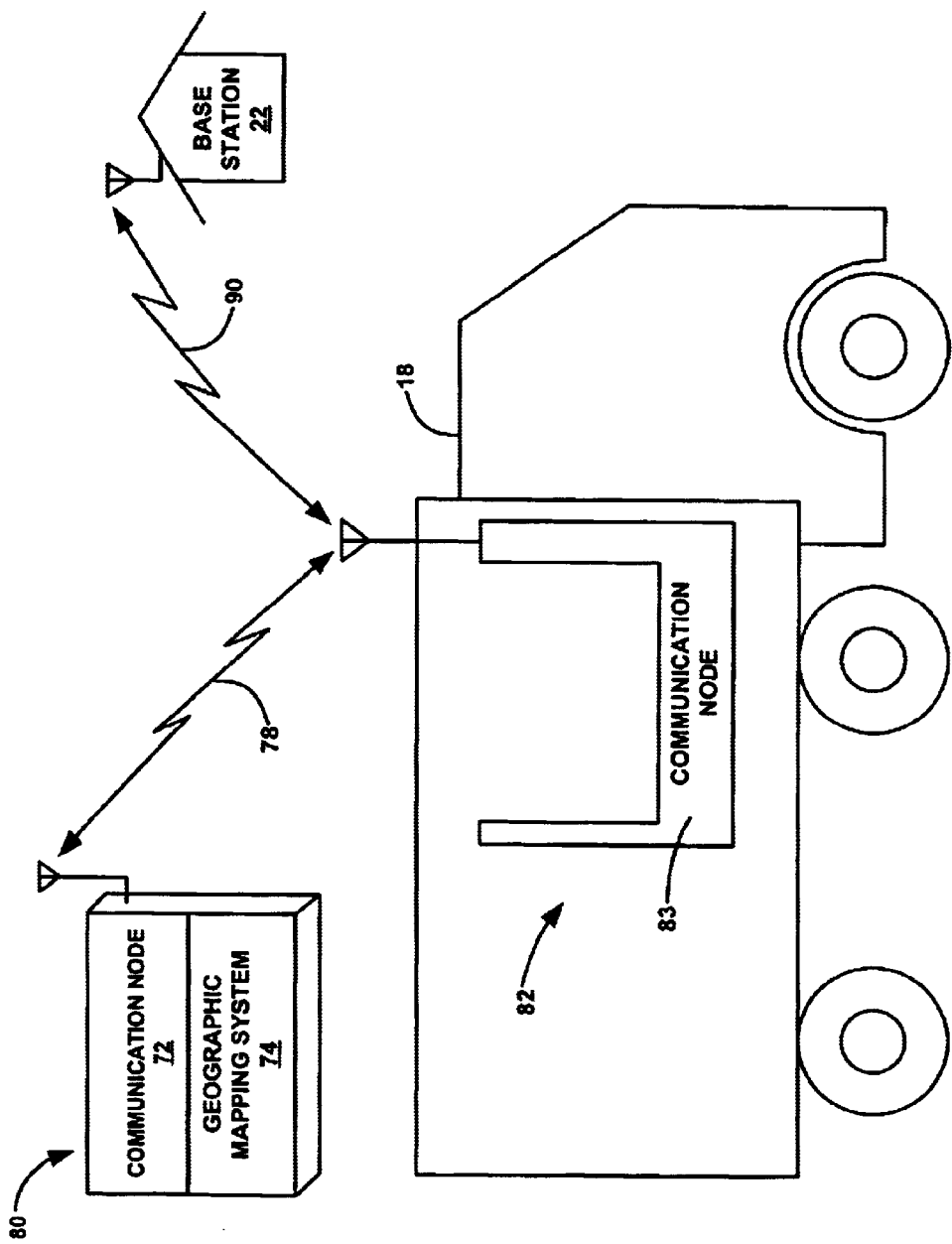
FIG. 3B is a schematic diagram of the real-time geographic mapping system of FIG. 3A wherein the system includes a portable data terminal in accordance with the present invention.

With reference next to FIG. 3B, a schematic diagram of another embodiment of the present invention is shown wherein real-time geographic information system 70 includes a portable data terminal 80. In the present embodiment, communication node 72 and geographic mapping system 74 are disposed within a portable data terminal 80. A docking station 82 is disposed within vehicle 18. As shown in FIG. 3B, portable data terminal 80 is removably attachable to docking station 82. That is, portable data terminal 80 can perform GIS functions when disposed within docking station 82 and when removed from docking station 82.

With reference still to FIG. 3B, in the present embodiment, when portable data terminal 80 is removed from docking station 82 portable data terminal 80 communicates with docking station 82. More specifically, communication node 72 of portable data terminal 80 transfers information over link 88 to communication node 83 of docking station 82. Docking station 82 then transfers information to and from base station 22 over link 90. In so doing, portable data terminal 80 is able to transmit using low power and still communicate, through docking station 82, with base station 22. Thus, portable data terminal 80 is able to operate using low power sources such as batteries. As with communication link 20 of FIGS. 1A–1C, and 1E, communication links 88 and 90 can be established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. Although communication node 83 of docking station 82 acts as a relay station for information transmitted to portable data terminal 80 from base station 22, the present invention is also well suited to having base station 22 transmit information directly to communication node 72 of portable data terminal 80.

Figure 4:
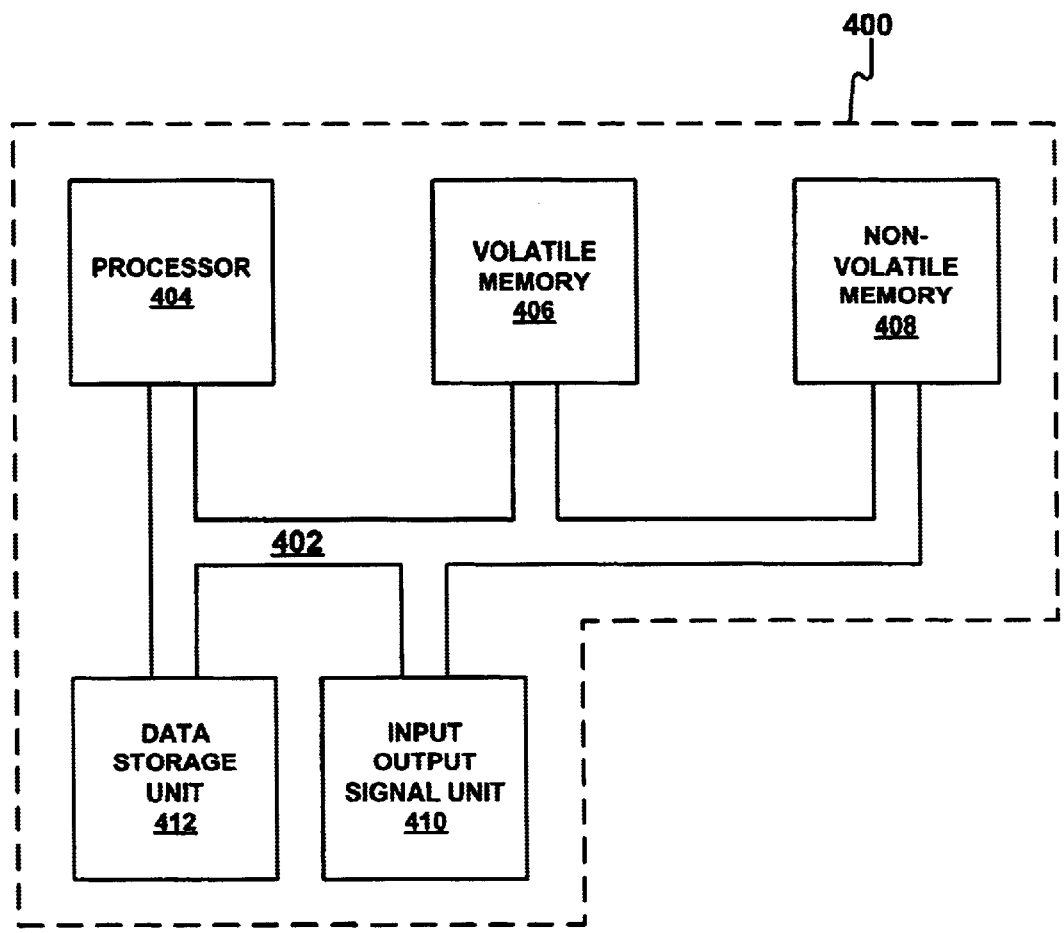
FIG. 4 is a logical representation of an exemplary computer system used as a part of a speech recognition equipped geographic information recording apparatus in accordance with the present invention.

With reference now to FIG. 4, portions of the present invention are comprised of computer executable instructions which reside in a computer system. FIG. 4 illustrates an exemplary computer system 400 used as a part of mobile data terminal in accordance with the present invention. Computer system 400 of FIG. 4 includes an address/data bus 402 for communicating information, a processor 404 coupled to bus 402 for processing information and instructions. Computer system 400 also includes data storage devices such as computer readable volatile memory unit 406 (e.g., RAM memory), and a computer readable non-volatile memory unit 408 (e.g., ROM, EPROM, EEPROM, PROM, flash memory, programmed antifuses, etc.). Both volatile memory unit 406 and non-volatile memory unit 408 are coupled to bus 402. An optional input/output signal unit 410 and another computer readable data storage unit 412 (e.g., a high capacity magnetic and/or optical disk drive) are both coupled to bus 402. Input/output signal unit 410 allows bus 402 to communicate externally with other devices. In one embodiment, procedures of the present invention, described below, are implemented as program code stored within the above referenced computer readable memories and executed by processor 404.

Figure 5:
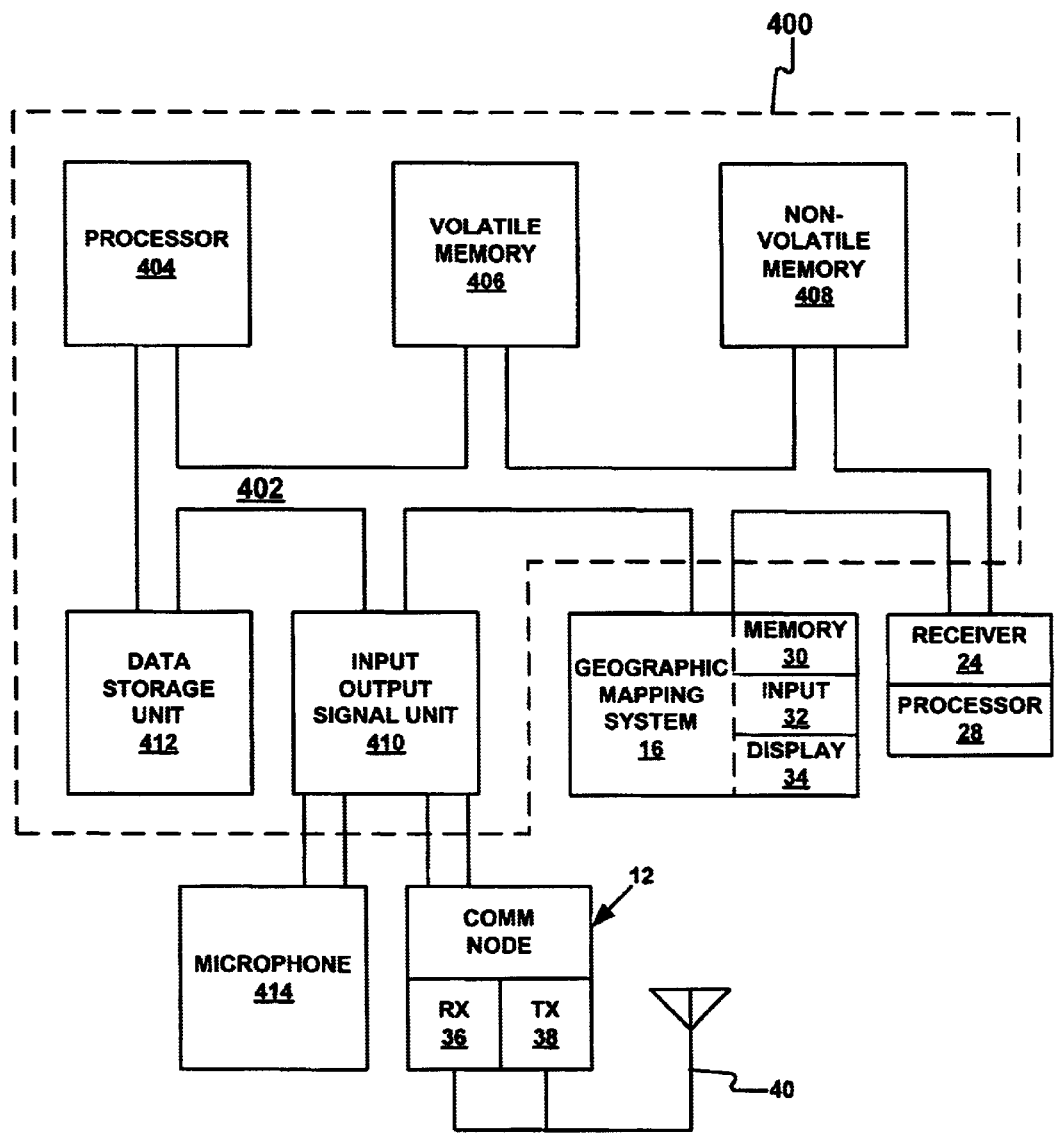
FIG. 5 is a logical diagram of speech recognition equipped geographic information recording system in accordance with the present claimed invention.

With reference now to FIG. 5, a logical diagram illustrating one embodiment of the present invention is shown. A position locating system (PLS) 14, including a signal receiver 24, having an antenna 26, and a signal processor 28, is coupled to computer system 400. Signal receiver 24 receives position information signals at antenna 26 and transfers the position information signals to signal processor 28. Signal processor 28 then generates position information indicative of the location of the mobile data terminal containing computer system 400. Position locating system 14 generates position information indicating, for example, the latitude, longitude, altitude, and velocity of the mobile data terminal. Position locating system 14 also accurately determines the time at which the mobile data terminal is at a specific location. The present embodiment also includes a geographic mapping system 16 which is coupled to computer system 400. Geographic mapping system 16 is described above in detail in conjunction with previous embodiments. In the present embodiment, geographic mapping system includes memory 30, an optional manual input 32 for entering information, and a display unit 34. In the present embodiment, memory 30 stores, for example, previously recorded geographic information. Optional manual input 32 in the present embodiment is comprised, for example, of a data entry keypad, a pen-type data entry pad, and the like. Although an optional manual input 32 is shown in the present embodiment, the present invention is also well suited to not having an optional manual input.

With reference still to FIG. 5, input output signal unit 410 of computer system 400 also has a microphone 414 and communication node 12 coupled thereto. Communication node 12 includes a receiver 36 a transmitter 38 and an antenna 40. Communication node 12 is discussed in detail above in conjunction with previous embodiments. It will be understood by those of ordinary skill in the art that numerous other well known features are not shown for purposes of clarity. Such well known features include but are not limited to, processing logic, user controls, power circuitry, and the like. In the present invention, position locating system 14 is, for example, a satellite-based radio navigation system. Satellite-based radio navigation systems such as the Global Positioning System (GPS), the Global Orbiting Navigational System (GLONASS), and the like are well suited for use with the present invention. Additionally, the present invention is also well suited to recording GPS ephemeris data. The present invention is also well suited to being used in conjunction with improved position determining accuracy provided by the impending wide area augmentation system (WAAS).

Figure 6:
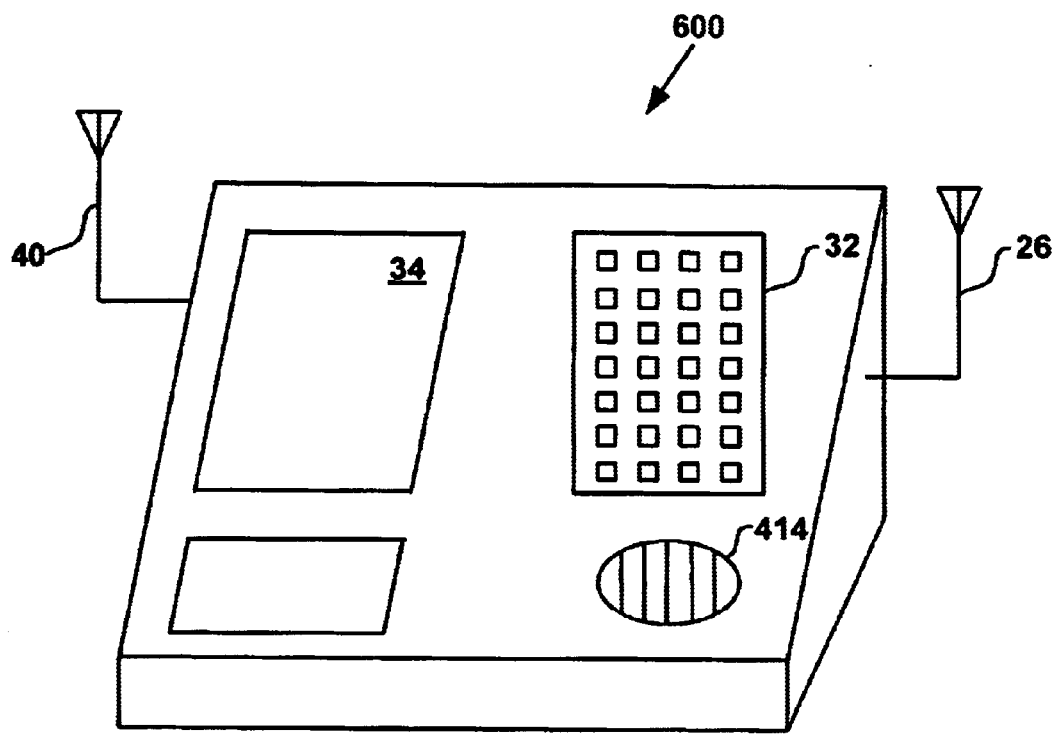
FIG. 6 is a perspective view of mobile data terminal which includes the computer system features of FIG. 5 in accordance with the present claimed invention.

With reference next to FIG. 6, a mobile data terminal 600 is shown. In the present embodiment, mobile data terminal 600 includes the computer system features of FIG. 5. Mobile data terminal 600 of the present embodiment includes a display 34, an optional manual input 32, and a microphone 414. Display 34 is comprised any one of a number of displays such as, for example, a flat screen display, a video monitor, an LCD display, and the like. Mobile data terminal 600 also has antennae 26 and 40 extending therefrom to accommodate position locating system 14 and communication node 12, respectively. As described in detail above, communication node 12 provides a communication link between mobile data terminal 600 and a base station, not shown. The communication link between mobile data terminal 600 and a base station is established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. The present invention is also well suited to having a real-time communication link between mobile data terminal 600 and a base station.

With reference still to FIG. 6, although mobile data terminal 600 is a shown as a free-standing mobile unit in the present embodiment, the present invention is also well suited to having mobile data terminal 600 mounted in a vehicle or other type of conveyance. In an embodiment in which mobile data terminal 600 is located in a vehicle, position locating system 14 can also function as a vehicle tracking system. The implementation and operation of a vehicle tracking system is described above in detail in conjunction with previous embodiments.

Although position locating system 14 is shown integral with mobile data terminal 600 in the present embodiment, the present invention is also well suited to having the position locating system 14 located separate from mobile data terminal 600. In an embodiment where position locating system 14 is located separately from mobile data terminal 600, position locating system 14 is communicatively coupled to mobile data terminal 600. Although a specific mobile data terminal structure 600 is shown in the present embodiment, the present invention is also well suited to the use of other mobile data terminals having different structural configurations and appearances.

In the present embodiment, an operator of mobile data terminal 600 records the location of an attribute to be collected. For example, the operator would speak the command "Record attribute location." Microphone 414 would convert the verbal command into an electrical signal which is then presented to input output signal unit 410. Input output signal unit 410 digitizes the electronic signal received from microphone 414 and relays the digitized signal to microprocessor 404 via system bus 402. The algorithms required for receiving and digitizing speech signals are implemented using speech recognition, data storage and other programming techniques well known in the computer arts. The present invention is well suited to activating screen menus or other operating features upon the verbalization of commands. Such speech activated screen menus and the like, are again accomplished using speech recognition, data storage and other programming techniques well known in the computer arts. Such speech recognition systems include, for example, 325 TI DSP's (digital signal processor) from Texas Instruments, Dallas Tex. Speech recognition systems are also produced by and available from International Business Machines (IBM) of Armonk, N.Y. In the present embodiment the verbalized command to "Record attribute location" causes position locating system 14 to determine the present location of mobile data terminal 600. It will be appreciated that mobile data terminal 600 will be disposed proximate to the attribute of interest.

Next, the operator of mobile data terminal 600 verbalizes attribute identifying information. Such information would include, for example, a general description of the attribute. For example, the operator would speak "Utility pole," or "Aluminum telephone pole," or the like. The present invention is also able to receive various other attribute information which may be verbalized. Such additional information will include, for example, the age of the attribute, the condition of the attribute, or any other identifying information which is of value. In so doing, the present invention records the location of and relevant information pertaining to an attribute using only verbal input from the operator. In the present invention, the speech recognition system is adapted to be programmed or initialized in any one of numerous ways. For example, the user can form a glossary of words which will be frequently spoken by speaking a word and then manually entering the word which was just spoken. In so doing, the speech recognition system can more readily determine what word or words the user is speaking. Furthermore, such a speech recognition system makes extremely efficient use of memory. The present invention is also well suited to employing a speech recognition system which converts spoken language to ASCII characters. In such an embodiment, the user verbalizes commands or information. The present invention then coverts the verbalized commands or information to ASCII text and displays the ASCII text on a graphic display. The user then checks the graphic display to confirm that the displayed text is the same as the verbalized commands or information. If the displayed text is not the same as the verbalized words, the user then adjusts the system using techniques well known in the speech recognition art.

Thus, in the present embodiment, the present invention receives verbalized operating commands as well as verbalized attribute information. Although such speech recognition capabilities are provided in the present embodiment, the present invention is also well suited to recognizing only verbalized attribute information or only verbalized operating commands. The present invention is also well suited to combining the above described procedures, such that the operator only verbalizes the attribute information. In such an embodiment, position locating system 14 automatically records the current location of mobile data terminal 600 once the operator verbalizes the attribute information. Hence, the present invention eliminates the need for inefficient and error prone manual entry of attribute location and identification information.

Figure 7:
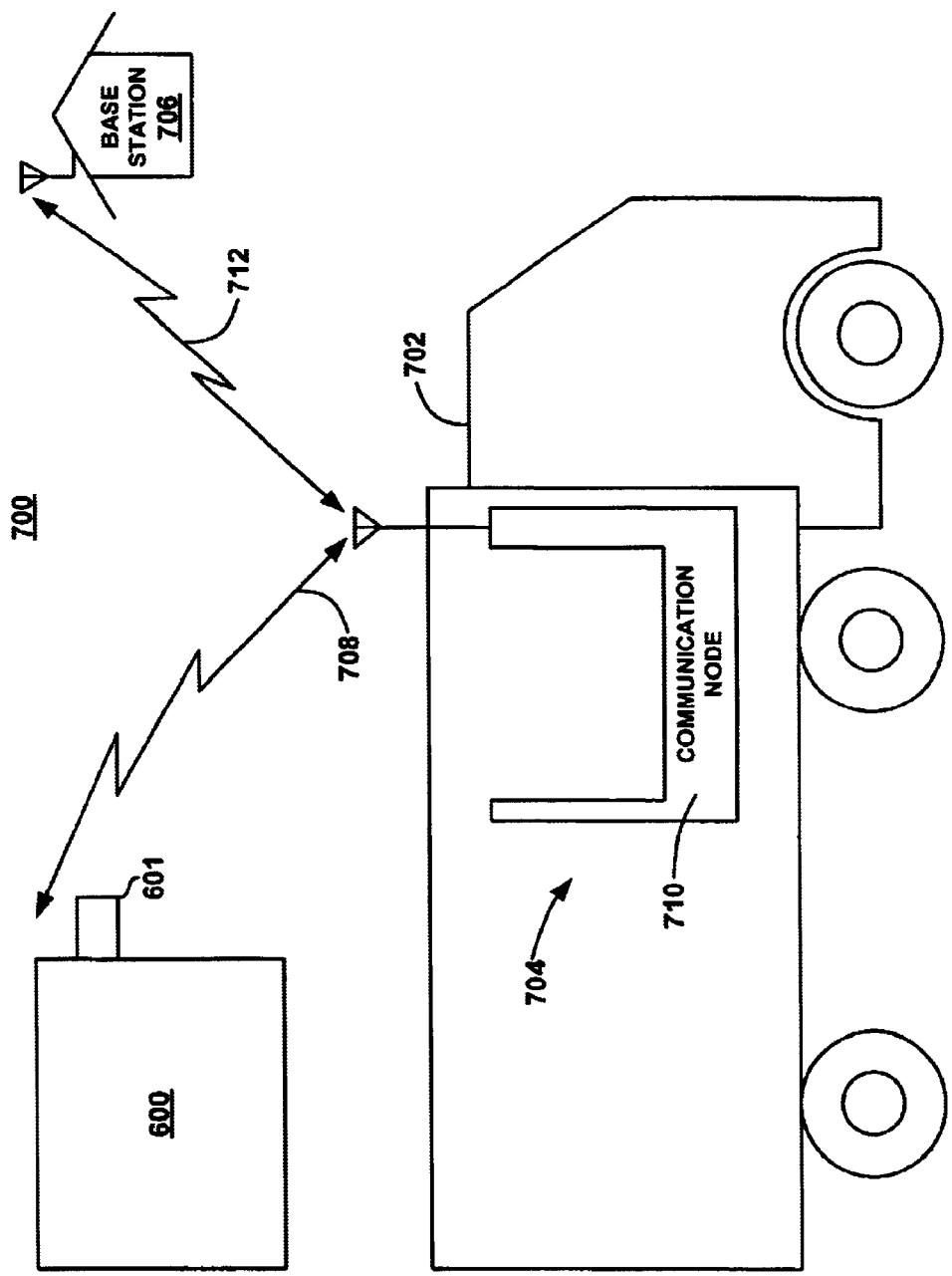
FIG. 7 is schematic diagram of another embodiment in which mobile data terminal is removably located within a vehicle in accordance with the present claimed invention.

With reference next to FIG. 7, a schematic diagram 700 of another embodiment of the present invention is shown wherein mobile data terminal 600 is removably located within a vehicle 702. In the present embodiment, communication node 12, position locating system 14, and geographic mapping system 16 are disposed within mobile data terminal 600. A docking station 704 is disposed within vehicle 702. As shown in FIG. 7, mobile data terminal 600 is removably attachable to docking station 704. That is, mobile data terminal 600 can perform all of the functions of the above-described embodiments when disposed within docking station 704 and when removed from docking station 704.

In the present embodiment, mobile data terminal 600 is a compact transportable unit which allows the user to carry mobile data terminal 600 to locations distant from vehicle 702. Thus, a user can enter geographic information or communicate with a base station 706 even when away from vehicle 702. Additionally, in the present embodiment, mobile data terminal 600 has a GPS receiver contained therein. Thus, in the present embodiment, the position of the user can be known or monitored by a dispatcher at, for example, base station 706 even when the user is not located within vehicle 702. Such information can be extremely beneficial should the user become injured or need to be located. That is, instead of having to return to vehicle 702 to activate a panic button, the user can activate a panic button 601 located on mobile data terminal 50. The distress signal then includes the geographic coordinates of the distressed user, not the coordinates of vehicle 702, thereby providing more efficient and faster responses.

In the present invention, a communication link between mobile data terminal 600 and vehicle 702 is established in one of numerous methods described in conjunction with the above-mentioned embodiments. That is, the communication link can be established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

With reference still to FIG. 7, in the present embodiment, when mobile data terminal 600 is removed from docking station 704, mobile data terminal 600 communicates with docking station 704. More specifically, communication node 12 of mobile data terminal 600 transfers information over link 708 to communication node 710 of docking station 704. Docking station 704 then transfers information to and from base station 706 over link 712. In so doing, mobile data terminal 600 is able to transmit using low power and still communicate, through docking station 704, with base station 706. Thus, mobile data terminal 600 is able to operate using low power sources such as batteries. As with communication link 20 of FIGS. 1A–1C, communication links 708 and 712 can be established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. Although communication node 710 of docking station 704 acts as a relay station for information transmitted to mobile data terminal 600 from base station 706, the present invention is also well suited to having base station 706 transmit information directly to communication node 12 of mobile data terminal 600.

In the present embodiment, communication links 708 and 712 are two-way communication links. Although such communication links are used in the present embodiment, the present invention is also well suited to employing one-way links between mobile data terminal 600 and docking station 704, and docking station 704 and base station 706. Furthermore, the present invention is also well suited to having real-time communication links between mobile data terminal 600 and docking station 704, and docking station 704 and base station 706.

Thus, the present invention provides a versatile GIS which has expanded functionality, a versatile GIS which is not limited to merely using GPS technology to create and annotate existing GIS data bases, a versatile GIS system which has improved marketability to potential consumers, and a GIS system which is easy and efficient for an operator to use.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A speech recognition equipped recording apparatus for recording attribute data in a geographic information system environment comprising:

a mobile data terminal having a communication node therein, said mobile data terminal for collecting attribute data in a geographic information system environment;

a geographic mapping system integral with said mobile data terminal, said geographic mapping system coupled to said communication node;

a speech recognition system coupled to said mobile data terminal, said speech recognition system adapted to receive said attribute data when verbalized by an operator of said mobile data terminal, said speech recognition system further adapted to receive operating commands verbalized by an operator of said mobile data terminal; and a position locating system coupled to said mobile data terminal for determining the location of an attribute when verbalized attribute data for said attribute are received via said speech recognition system, wherein said mobile data terminal uses verbalized attribute data for said attribute and said location of said attribute to update information stored by said geographic mapping system.

2. The speech recognition equipped geographic information apparatus of claim 1 wherein said communication node further includes:

a transmitter for sending information from said speech recognition equipped geographic information apparatus to a desired location, and a receiver for receiving at said speech recognition equipped geographic information apparatus information from said desired location.

3. The speech recognition equipped geographic information apparatus of claim 1 wherein said communication node further includes a real-time communication link between said speech recognition equipped geographic information apparatus and at least one desired location.

4. The speech recognition equipped recording apparatus for recording attribute data in a geographic information system environment of claim 1 wherein said attribute data further comprises non-geographic attribute data.

5. A portable integrated geographic information and automatic vehicle location system for recording attribute data in a geographic information system environment, said portable integrated geographic information and automatic vehicle location system comprising:

communication means for providing a two-way communication link between a vehicle and at least one base station, said communication means further including:
a transmitter for sending information from said integrated geographic information and automatic vehicle location system to said at least one base station; and
a receiver for receiving at said integrated geographic information and automatic vehicle location system information from said at least one base station;

a vehicle position tracking system coupled to a vehicle to be monitored, said vehicle position tracking system coupled to said communication means, said vehicle position tracking system further including:
a GPS signal receiver;
a signal processor coupled to said signal receiver for generating position information from signals received by said GPS signal receiver; and a geographic mapping system adapted to be disposed within said vehicle to be monitored, said geographic mapping system coupled to said communication means, said geographic mapping system further including:
memory means for storing previously recorded first geographic information;
verbally responsive input means for entering second geographic information;
display means for displaying visual representations of said previously recorded first geographic information and said newly entered second geographic information; and a speech recognition system adapted to receive attribute data verbalized by an operator of said vehicle position tracking system, said speech recognition system further adapted to receive operating commands verbalized by an operator of said mobile data terminal, wherein said portable integrated geographic information and automatic vehicle location system uses said attribute data verbalized by said operator with the location of said vehicle position tracking system at the time said attribute data are verbalized to update said previously recorded first geographic information.

6. The portable integrated geographic information and automatic vehicle location system of claim 5 wherein said two way communication link is a real-time communication link between said vehicle to be monitored and said at least one base station.

7. The portable integrated geographic information and automatic vehicle location system of claim 6 wherein real-time two-way communication between said integrated geographic information and automatic vehicle location system and said at least one base station is maintained when said integrated geographic information and automatic vehicle location system is removed from said vehicle to be monitored.

8. The portable integrated geographic information and automatic vehicle location system of claim 5 wherein said system is removable from said vehicle to be monitored.

9. The portable integrated geographic information and automatic vehicle location system for recording attribute data in a geographic information system environment of claim 5 wherein said attribute data further comprises non-geographic attribute data.

10. In a computer system including a processor coupled to a bus, a Global Positioning System (GPS) receiver coupled to said processor, and a memory unit coupled to said bus for storing information, a computer-implemented method for capturing attribute data for use in geographic information systems, said computer-implemented method comprising the steps of:

recording the location of an attribute using a mobile data terminal, said location of said attribute determined using said mobile data terminal;
receiving verbalized identifying information for said attribute at said mobile data terminal;
associating said verbalized identifying information with said location of said attribute; and
modifying a geographic information system data base to include identifying information for said attribute based on said verbalized identifying information.

11. The computer-implemented method as recited in claim 10 wherein said step of recording the location of an attribute to be collected further comprises the steps of:

placing said mobile data terminal proximate to said attribute to be collected; and
activating a position locating system coupled to said mobile data terminal such that said location of said mobile data terminal proximate to said attribute is recorded.

12. The computer-implemented method as recited in claim 11 wherein said step of activating a position locating system coupled to said mobile data terminal further comprises the step of:

activating a GPS based position locating system coupled to said mobile data terminal.

13. The computer-implemented method as recited in claim 10 further comprising the step of:

verbalizing mobile data terminal commands to operate said mobile data terminal.

14. The computer-implemented method as recited in claim 10 further comprising the steps of:

sending information from said mobile data terminal to a desired location using a transmitter integral with said mobile data terminal, and
receiving at said mobile data terminal information from said desired location using a receiver integral with said mobile data terminal.

15. The computer-implemented method as recited in claim 14 further comprising the step of:

sending said information from said transmitter of said mobile data terminal to aid desired location over a real time communication link.

16. The computer-implemented method as recited in claim 14 further comprising the step of:

receiving said information from said desired location at said receiver of said mobile data terminal over a real time communication link.

17. The computer-implemented method for capturing attribute data for use in geographic information systems as recited in claim 10 wherein said attribute data further comprises non-geographic attribute data.

* * * * *